Dec. 15, 1925.
N. M. BAKER
1,565,890
LENS RETAINING MEMBER
Filed July 30, 1924
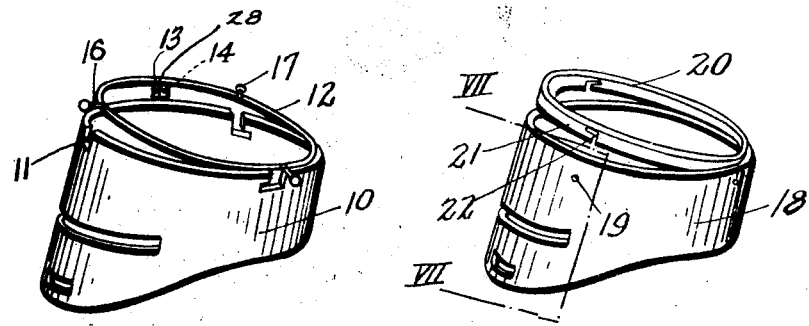
FIG. I  FIG. II
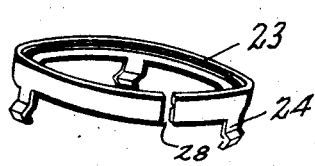  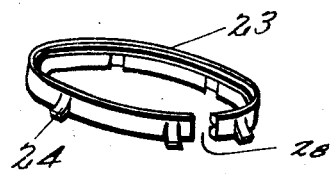
FIG. III  FIG. IV
  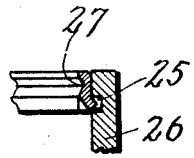  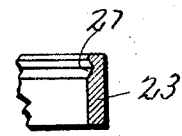
FIG. V  FIG. VI  FIG. VII
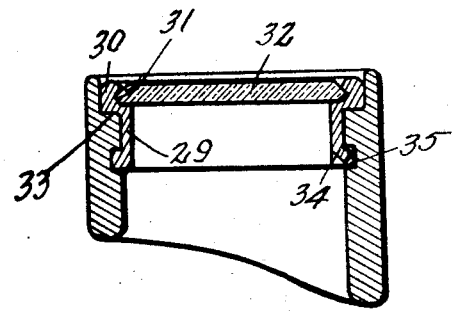  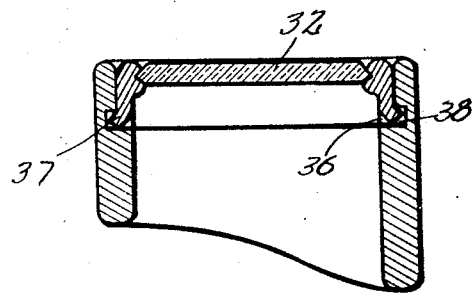
FIG. VIII  FIG. IX
INVENTOR
NELSON M. BAKER
BY
Harry H. Styll
ATTORNEY Patented Dec. 15, 1925.

1,565,890

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-RETAINING MEMBER.

Application filed July 30, 1924. Serial No. 729,071.

*To all whom it may concern:*

Be it known that I, NELSON M. BAKER, a citizen of the United States, residing at Southbridge, in the county of Worcester and State of Massachusetts, have invented certain new and useful Improvements in Lens-Retaining Members, of which the following is a specification.

The present invention relates to lens retaining means for goggles, and has particular reference to retaining means adapted to be coupled up with a lens to form a unit.

An important object of the invention is to provide lens retaining means for goggles wherein the lens may be associated with the retaining means and placed into and out of operative position with the goggle eye cup as a unit.

Another important object of the invention is to provide lens retaining means for goggles wherein the lens is associated with the retaining means prior to the association thereof with the goggle eye cup in such a manner that the lens and retaining means may be handled as a unit so that lenses may be interchanged in the goggle eye cups as often as desired very readily.

Another important object of the invention is to provide lens retaining means for goggles adapted to be associated with a lens whereby the lens and retaining means may be handled as a unit, the said retaining means making it exceptionally easy to change lenses in a goggle, and which presents a firm construction, thus preventing accidental displacement of the lenses while in use, the said goggle also having a pleasing appearance.

Other objects and advantages of the invention will become apparent during the course of the following description.

In the drawings, wherein like numerals are employed to designate like parts throughout the same:

Figure I is a perspective view illustrating one form of lens retaining means;

Figure II is a similar view of a slightly modified means;

Figure III is a perspective view of another form of retaining means;

Figure IV is another modification;

Figure V is a section through Figure I;

Figure VI is a fragmentary section through the form shown in Figure IV when in use;

Figure VII is a section taken on line VII—VII in Figure II;

Figure VIII is a section taken through a goggle employing another form of retaining means, and Figure IX is a similar section of a still different form.

In the drawings, wherein for the purposes of illustration is shown the preferred embodiment of the invention, the numeral 10 in Figure I designates an eye cup having a plurality of bayonet slots 11 formed therein. The lens retaining means comprises a circular frame 12, which, as is shown in Figure V, is similar to the ordinary eye wire used in spectacles. The rim 12 is provided with the end piece connections 13, which are held together by means of a screw or the like 14. This permits the frame 12 to be opened up to allow of the insertion of a lens therein, as shown in Figure V. The lens 15 is then securely fastened in the groove of the frame 12 so that when the end pieces 13 are tightened by means of the screw 14 the lens will not be allowed to become accidentally displaced. The rim 12 is also provided with the pins 16 having the knobs 17 thereon; the pins 16 extend from the rim and are adapted to be received within the bayonet slots 11 formed in the cup 10. Obviously the pins 16 will be carried on the frame 12 in the same relationship that the slots 11 are formed in the cup. In the present construction the pins are adapted to be dropped in the bayonet slots and the frame is given a slight twist by means of the knob 17, so as to prevent displacement thereof. In this form of construction it will be seen that the lens and lens retaining means are coupled as a unit and placed in operative position and removed therefrom with respect to the goggle. In this way various forms of lenses may be used in the cups with very little trouble.

In Figure II a reversal of parts is shown, wherein the cup 18 is provided with the inwardly extending pins 19. The frame or eye wire construction 20 is provided with a depending lip 21 in which are formed the bayonet slots 22 adapted to receive the pins 19 carried by the cup 18.

In Figures III and IV, the frame 23 is provided with the spring fingers 24, the said spring fingers being adapted to be received within the groove 25 formed in the cup 26. The rim 23 is provided with the V-shaped groove 27. The rims 23 shown in Figures III and IV are split as at 28 to permit of the insertion of the lens within the groove 27. To associate the lens retaining means and lens with the cup member, the lens is placed within the groove and the retaining means pressed together so as to firmly engage the cup, after which they are inserted within the open end of the cup. It will be seen that the spring fingers initially will be moved inwardly until they are free to swing out onto the groove 25 formed in the cup. It will then be possible to spring the lens and lens retaining means further within the cup and it will require more than accidental jars to again remove the lens and lens retaining means from the interior of the cup. However, with slight pressure from the inside of the cup the retaining means may be easily removed for a renewal of lenses, or the like.

In Figures VIII and IX, slightly modified constructions are shown, wherein the retaining means or rings 29 are, in Figure VIII, provided with the extensions 30, in which are provided the grooves 31 to receive the lens 32. The offset extensions 30 are adapted to seat on the shoulder 33 while the spring fingers 34 are received within the groove 35.

In Figures IX the ring proper rests upon the shoulder 36, while the fingers 37 are received within the groove 38.

In all of these instances it will be seen that the lens and lens retaining means are coupled together before insertion within the eye cup, so that they are handled as a unit, thus simplifying the construction of the eye cup and also facilitating replacement of the lenses when desired. Furthermore, the cups are not injured in any manner during the removal and replacing of new lenses, so that the cups always retain their initial appearance.

It is to be understood that the form of invention herewith shown and described is to be taken as the preferred embodiment of the same and that various changes in the shape, size and arrangement of parts may be resorted to without departing from the spirit of the invention or the scope of the subjoined claims.

Having thus described my invention, what I claim is:

1. In a device of the character described, an annular eye cup having bayonet joint connections at one end thereof, a split elastic ring having a lens groove, and bayonet joint connections, fitted into the eye cup whereby the bayonet joint connections of the two members engage to hold the ring in the eye cup, and whereby the ring is compressed to retain a lens in the lens groove thereof.

2. In a device of the character described, an annular eye cup having a recessed connection portion at one end thereof, a split elastic ring having a lens groove and peripheral lugs adapted to fit into the recessed connection portion of the eye cup to hold the ring therein, said ring fitting into the end of the eye cup, whereby the ring is compressed to retain a lens in the lens groove thereof.

NELSON M. BAKER.